United States Patent
Suggs et al.

(10) Patent No.: US 6,665,925 B1
(45) Date of Patent: *Dec. 23, 2003

(54) APPARATUS AND METHOD FOR MANUFACTURING RUBBER-WRAPPED SPIRAL WOUND GASKETS

(75) Inventors: Steven Suggs, Nacogdoches, TX (US); Kris Kolb, Nacogdoches, TX (US); Ken Fulmer, Tyler, TX (US)

(73) Assignee: Acadia Elastomers Corporation, Nacogdoches, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,248

(22) Filed: Dec. 11, 2001

(51) Int. Cl.[7] .............................................. B23P 23/00
(52) U.S. Cl. ...................... 29/564.8; 29/33 K; 29/564.7
(58) Field of Search ............... 29/33 K, 33 R, 29/564.2, 458, 451, 527.2, 417, 402.02, 564.7, 564.8

(56) References Cited

U.S. PATENT DOCUMENTS

| | | | | | |
|---|---|---|---|---|---|
| 3,858,312 | A | * | 1/1975 | Gharaibeh | 29/605 |
| RE29,702 | E | * | 7/1978 | Owen et al. | 29/520 |
| 4,189,819 | A | * | 2/1980 | Nicholson | 29/417 |
| 4,203,191 | A | * | 5/1980 | Gibson, Sr. | 29/451 |
| 4,239,245 | A | * | 12/1980 | Giglio et al. | 277/528 |
| 5,395,469 | A | * | 3/1995 | Suggs, Jr. et al. | 156/173 |
| 6,195,867 | B1 | * | 3/2001 | Hashiguchi et al. | 29/455.1 |
| 6,540,852 | B1 | * | 4/2003 | Suggs et al. | 156/62.2 |
| 2003/0070279 | A1 | * | 4/2003 | Harding | 29/527.2 |

FOREIGN PATENT DOCUMENTS

DE 3201263 * 7/1983 ............... 29/33 K

OTHER PUBLICATIONS

Leader Gasket, Technical Data Sheets, Revision 1.2, Apr. 1996, Section 1–10.

The Global leader in Metallic Gaskets brochure, JM Clipper Corporation, 403 Industrial Drive, Nacogdoches, TX 75961 (undated).

Johns–Manville Packings and Gaskets brochure, pp. H8–H13 (undated).

Design Data, Johns–Manville, Spirotallic Gaskets, pp. GM–911–1–GM–911–21, Jun. 19, 1962.

Klozure ® Oil Seats Master Catalog, pp. 1, 6, 7; Garlock Inc., 1666 Division Street, Palmyra, NY 14522, May 1995.

Master Oil Seal Catalog, pp. 1–3, 5–7, 9, 11, 13–18, 25–28, 127; JM Clipper Corporation, 403 Industrial Drive, Nacogdoches, TX 75961, Jul. 1995.

* cited by examiner

Primary Examiner—A. L. Wellington
Assistant Examiner—Erica E Cadugan
(74) Attorney, Agent, or Firm—Baker, Donelson, Bearman, Caldwell & Berkowitz

(57) ABSTRACT

An apparatus (10) for manufacturing rubber-based spiral wound gaskets, in which a length of an elongate band (22) passes through a bath (34) for applying a coating of a rubber sealing material and then is wound in overlapping relation on a die (100) to make a spiral wound gasket. Wire brushes (70) remove the rubber sealing material from selected portions of the band, to define interior and exterior diameter portions of the wound gaskets. The die (100) defines a slot (102) extending inwardly from a perimeter for receiving a distal end portion of the elongate band (22) so that the gasket does not unwind. A fixing device (120) secures selected portions of the wound elongate band together at the interior and exterior diameters. A cutter (90) severs the elongate band (22) in order to remove the spiral wound gasket from the apparatus (10). A tapper (134) moves strikingly against a perimeter portion of the die to dislodge the spiral wound gasket. A method is disclosed that winds the elongate band around the perimeter of the die (100) until a desired radially thick spiral wound gasket is formed.

10 Claims, 3 Drawing Sheets

# APPARATUS AND METHOD FOR MANUFACTURING RUBBER-WRAPPED SPIRAL WOUND GASKETS

TECHNICAL FIELD

The present application relates to gasket manufacturing apparatus and processes. More particularly, the present invention is directed to apparatus and methods for manufacturing rubber spiral wound gaskets.

BACKGROUND OF THE INVENTION

Spiral wound gaskets made of rubber-derivative materials are used typically for oil seal connections in industrial processing applications. The rubber-based spiral wound gaskets are typically formed by rolling a thin sheet of rubber material in overlapping relation to form a tube. The overlapping layers of the rubber sheet define the radially-thick gasket having an inner diameter and an outer diameter for being received in a sealing application. A cross-section is cut through the tube to form a disc-like gasket of a selected thickness, having the selected inner diameter and outer diameter. The disc is pressed in a mold having an inner and outer diameter lip material for sealing. A primer encapsulates the windings of the rubber material with the lip material.

While these processes have resulted in rubber-based gaskets suitable for oil sealing and other applications, there are drawbacks to the apparatus and methods of manufacturing such gaskets. It is cumbersome to hold the sheet while rollingly winding the sheet into a tube. The tube must be held rolled while gaskets are cut, and the cut gaskets also must be held from unwinding. Further, the tube often can not be completely cut to form gaskets. The ends loosen and generally a portion of the tube must be scrapped.

Accordingly, there is a need in the art for an improved method and apparatus for manufacture for rubber-based spiral wound gaskets. It to such that the present invention is directed.

BRIEF DESCRIPTION OF THE PRESENT INVENTION

The present invention provides an apparatus and method for manufacturing rubber-based spiral wound gaskets. The apparatus for making a spiral wound gasket comprises a feeder that communicates a length of an elongate band for winding in overlapping relation to make a spiral wound gasket. The elongate band passes through a fluidial bath of a sealing material whereby the elongate band becomes enclosed within a jacket of the sealing material. A rotatable die defining a slot extending inwardly from a perimeter of the die receives a distal end portion of the elongate band, for winding around the perimeter of the die a length of the elongate band including the jacketed portion thereof. The apparatus provides a fixing device for securing selected portions of the wound elongate band together and a cutter for severing the elongate band, whereby the spiral wound gasket made with the length of the elongate band is separable from the apparatus. A tapper movable from a first position in alignment with a perimeter portion of the die to a second position striking forcibly against the perimeter portion of the die selectively dislodges the spiral wound gasket. The elongate band, being engaged to the die by the distal end portion of the elongate band being received in the slot, is wound around the perimeter of the die until a desired radially thick spiral wound gasket is formed and upon being secured together by the fixing device, the cutter operating to sever the elongate band and the tapper striking the perimeter portion of the die to dislodge the spiral wound gasket therefrom.

In another aspect, the present invention provides a method for manufacturing a rubber-based spiral wound gasket, comprising the steps of:

(a) receiving in a slot extending inwardly from a perimeter edge of a die a distal end portion of an elongate band having at least a length portion jacketed by a rubbery sealing material;

(b) winding a length of the jacketed elongate band around the perimeter of the die; and (c) fixing selected portions of the wound elongate band together to form a rubber based spiral wound gasket.

Objects, features, and advantages of the present invention will become apparent from a reading of the following detailed description of the invention and claims in view of the appended drawings.

DETAILED DESCRIPTION OF THE PREFERRED EMBODIMENTS

Figure 1:
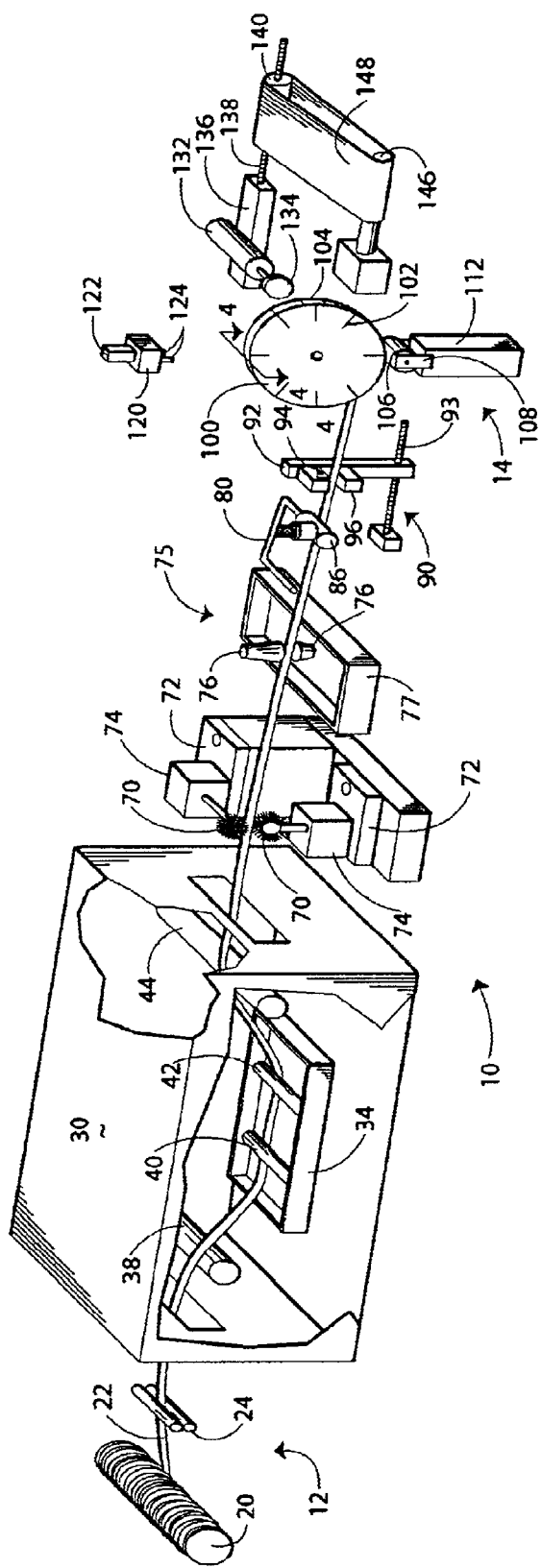
FIG. 1 illustrates in perspective schematic view an apparatus according to the present invention for manufacturing spiral wound gaskets.

Referring now in more detail to the drawings, in which like numerals indicate like parts throughout the several views, FIG. 1 is a perspective schematic view of an apparatus 10 for manufacturing rubber-based spiral wound gaskets according to the present invention. The apparatus 10 includes a band supply section 12, a gasket forming section generally 14, and a gasket discharge section 16.

The band supply section 12 includes a supply 20 of an elongate band 22. In a preferred embodiment, the elongate band 22 is a narrow fiber web. The band 22 passes between a pair of opposing guide rollers 24.

Adjacent the guide rollers 24 is a housing 30 for a sealing material bath 34 that holds a fluidial mixture of a sealing material to be coated onto the elongate band. The sealing material is preferably rubber-based. Spaced-apart rollers 38, 40, and 42 guide the elongate band into and through the solution contained within the bath 34 for coating with the sealing material. The sealing material dries rapidly upon the continued travel of the elongate band out of the bath 34. A return roller 44 in the housing 30 directs the elongate band 22 to an outlet 46.

In an alternate embodiment, the sealing material is applied by passing the elongate band past a plurality of spray nozzles that communicate with a supply of the sealing material. The spray nozzles are selectively actuated to apply sealing material to at least a length of the elongate band.

A pair of pivotally mounted wire brushes 70 are disposed on opposing sides of the travel path for the elongate band 22 near the exit from the housing 30. The wire brushes 70 mount on pivotable bases 72 in order to move from a first position spaced-apart from the elongate band 22 to a second position with the wire brushes 70 in contact with the respective face of the elongate band. The wire brushes 70 are rotatable such as by a pneumatic motor 74 which rotates the shaft on which the wire brushes 70 mount.

A treatment station 75 includes spray nozzles 76 which communicate with a supply of a treating solution. A tray 77 collects the overspray. The sprayer 76 in the treatment section 75 applies a spray coating to the jacketed portion of the elongate band. In a preferred embodiment, the spray is an acid bath to provide increased temperature range for the gasket having the jacket of a rubber sealing material. The treatment solution is selected from the group of phosphoric acid, aluminum hydroxide, silicone carbonate, and boron.

An idler arm 80 connects by a pivot 82 to the frame for the apparatus 10. The arm 80 is biased by a spring. A roller 86 attaches to a laterally extending distal portion of the arm 80. The roller 86 guides the band 22 into a cutter assembly 90.

The cutter assembly 90 mounts to a movable frame 92. The frame 92 moves from a retracted position to an extended position as operated by a motor-driven screw assembly 93. The cutter 90 includes a pivotable knife 94. The knife 94 moves from a first position away from an opening in the cutter assembly 90 to a cutting position whereby the band 22 passing through the opening is severed. A table 96 reciprocally mounts to the cutter assembly 90. The table 96 moves between a first position adjacent the cutter assembly 90 and a second position spaced-apart from the cutter assembly. In the first position, the table 96 firmly bears against the band 22 in the cutter assembly 90 to hold the band secure during the cutting operation of the knife 94. The table 96 drops to the second position during the winding process for forming the spiral wound gasket of the present invention, as discussed below.

The gasket forming section 14 includes a rotatable die 100. The die 100 in the illustrated embodiment is an annular disc in which at least one slot 102 is formed. The slot extends inwardly from a perimeter edge 104 of the die 100. The perimeter edge 104 conforms in cross sectional shape to the surface defined by the crimp rollers 24 whereby the metal band 22 is matingly held to the perimeter edge 104 of the die 100. A tracking roller 106 mounts to a frame 108 that is spring biased to a support column 110. The support column includes a potentiometer 112 to measure the movement of the support frame 108 in the support column 110.

A welding apparatus 120 is disposed opposing the tracking roller 106. The welding apparatus 120 connects to a reciprocal member 122 in order to move the welding apparatus 120 from a first position spaced-apart from the die 100 to a second position in which a pair of welding members 124 are in contact with portions of the elongate band 22 on the die 100. The welding members 124 provide for securing positions of elongate band together, such as by sonic welding, adhesive, hot contact securing, and other suitable rapid securing mechanisms.

The gasket discharge section 16 includes a tapping apparatus 130. The tapping apparatus 130 has a pneumatic cylinder 132 from which a piston extends and retracts. A tapper 134 attaches to the distal end of the piston of the cylinder 132. In the illustrated embodiment, the tapper 136 is a bronze disc. The cylinder 132 mounts to an arm 136 that encloses, a screw rod 138. The screw rod 138 attaches to the end of the arm 136. The opposing end of the screw rod 138 defines a roller 140. A motor 142 connects to a driver roller 146. A belt 148 extends between the driver roller 146 and the roller 140.

Figure 3:
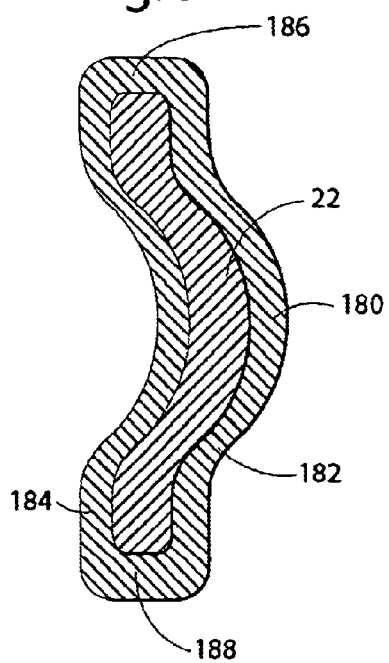
FIG. 3 is a cross-sectional view of a elongated band jacketed with the sealing material by the apparatus illustrated in FIG. 1.

FIG. 3 is a cross-sectional view of the elongate band 22 after exiting the sealing material housing 30. The elongate band 22 is enclosed in a jacket 180 of the rubber sealing material with opposing thick regions generally 182, 184 on the side faces of the band 22 and opposing thin regions 186, 188 on the relatively thin sides of the band 22.

Figure 2:
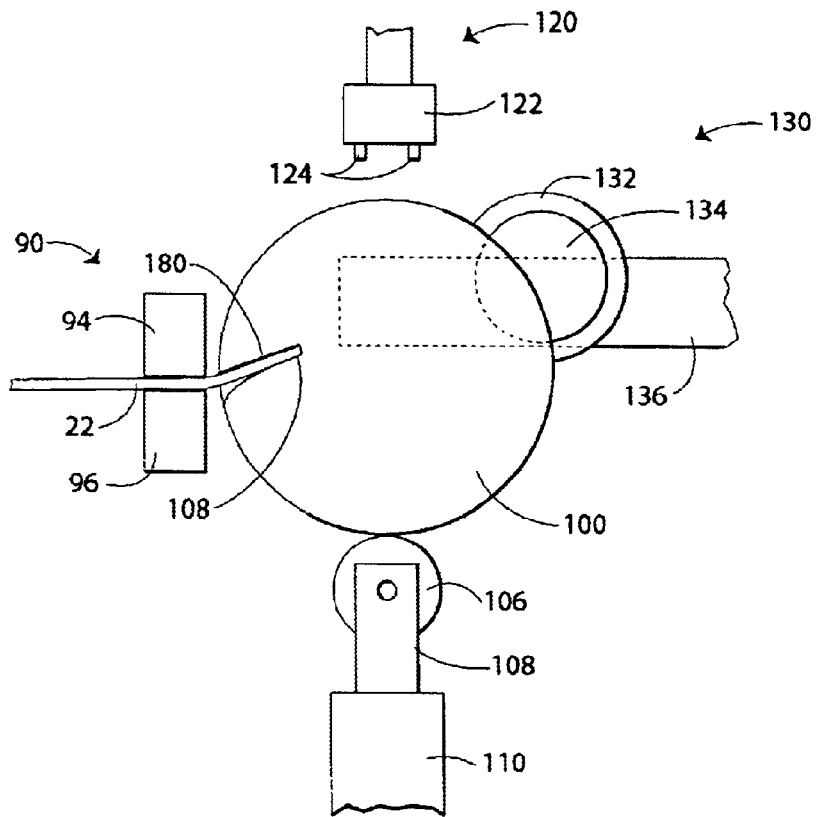
FIG. 2 is a side elevational view of a gasket forming section of the apparatus illustrated in FIG. 1.

FIG. 2 is a partial view of the gasket forming section 14 showing details of the gasket formed on the die 100 in the forming section 14. The die 100 is illustrated with a plurality of turns of the coated elongate band 22 wound around the perimeter 104 to form the gasket according to the present invention. The welding apparatus 120 is illustrated spaced-apart from the radially thick cross-sectional view of the gasket, prior to moving into position for securing portions of the elongate band 22 together.

With reference to FIG. 1, the apparatus 10 of the present invention is operated in order to form a spiral wound gasket. The roll of the narrow thin elongate band 22 is attached to a rotatable mandrel in the band supply section 12 to provide a supply of the elongate band for winding into the spiral wound gasket. The elongate band 22 feeds through the opposing guide rollers 24 over the rollers 38, 40 and passes through a cleaner bath solution held in the bath 32. The cleaner solution removes the contaminants, such as oils and other materials left on the elongate band 22 during manufacturing. The rubber-based sealing material is then applied to the elongate band 22. The band 22, guided by the rollers 42, passes into the bath 34 for application of the rubber-based sealing material held in the bath. The coated band 22 passes over the roller 44 and the roller 48 and exits from the housing 30 through the opening 46.

At the treatment station 75, the spray nozzle 76 communicates the treating solution to the jacketed elongated band 22 overspray collects in the tray 77.

Periodically, the wire brushes 70 are pivoted from the spaced-apart position to the contact position whereby the wire brushes 70 are brought into contact with the jacketed elongate band 22. The motors 74 operate in order to rotate the wire brushes 70 which bear against the opposing broad faces of the elongate band 22. The wire brushes remove the rubber jacket 180 from the portion of the elongate band 22 on which the brushes are brought into contact. The purpose of removing the rubber sealing material from a portion of the elongate band 22 is to provide band surfaces for welding and for being exposed on the inner diameter and outer diameter of the completed spiral wound gasket, as discussed below. The elongate band 22 passes under the idler roller 86 attached to the idler arm 80. The elongate band 22 is held in the cutter assembly 90. The table 96 reciprocates from the first position to the second position bearing the elongate band against the cutter assembly 90. In the spaced-apart position of the table 96 the elongate band 22 is spaced apart from the cutter assembly 90, as discussed below.

With reference to FIG. 2, the cutter assembly 90 moves between the retracted position whereby the cutter assembly 90 is spaced-apart from the die 100 and the extended position in which the cutter assembly 90 is brought close to the perimeter edge 104 of the die 100. In this position, the elongate band 22 is held between the table 96 and the cutter assembly 94. A distal portion 180 of the band 22 is fed into the slot 108 in the disc 100. The disc 100 is rotated in order to start winding the elongate band 22 about the perimeter 104 of the die 100. As the initial portion of the elongate band reaches the tracking roller 106, the table 96 is released and drops to the second spaced-apart position. The idler arm 80 moves downwardly as the table 96 moves downwardly. The table 96 moves out of the way, and the roller 92 guides the travel of the elongate band 22 as it moves longitudinally towards the die 100.

The apparatus 10 is configured whereby the elongate band 22 defines a tangent to the die 100, in order to avoid bending the elongate band 22 as it wraps around the perimeter 104 of the die. One and one half revolutions of the die 100 are made. The die 100 stops rotating. The welding apparatus 120 moves from its retracted position to the engagement position placing the welding tips 124 against the elongate band 22 opposing the tracker roller 106. The welding apparatus 120 is operated to secure the overlapping band 22 together. In the illustrated embodiment, the welding tips 124 are electrodes. An electric current communicated between the electrodes through the metal elongate band 22 spot welds the outer wrap to the inner wrap. The welding apparatus 120 then moves to its retracted position spaced apart from the die 100. The die 100 resumes rotating in order to wind a plurality of overlapping layers of the elongate band onto the die 100 and thereby form a radially increasing thickness of a gasket.

The tracker roller 106 is biased to the support column 110. The potentiometer 112 measures the change in the position of the tracker roller 106 relative to the support column 110. This provides a measure of the increasing radial thickness of the spiral wound gasket being formed on the die 100. At an appropriate time, depending on the outer diameter of the gasket being formed, the wire brushes 70 are pivoted from the retracted position to a position where the wire brushes bear against the wide faces of the elongate band 22. The wire brushes 70 are rotated by the motors 74 in order to brush away the rubber sealing material covering a portion of the elongate band 22. The length of the portion for which the jacket 180 is removed is a length sufficient to provide at least one and a half ending wraps of the elongate band around the gasket being formed, as well as to provide one and a half leading wraps of the elongate band 22 for the next gasket to be formed. It is to appreciated that this portion includes the short distal portion 180 received in the slot 108.

When the final one and a half wraps of the unjacketed elongate band 22 are made, the rotation of the die 100 stops. The welding apparatus 120 moves from the retracted position to a contacting position with the welding tips 124 in contact with the exterior surface of the elongate band on the die 100. The welding apparatus 120 is actuated to spot weld the distal end of the gasket being formed on the die 100. The welding apparatus 120 then retracts.

The motor 142 is operated to drive the belt 148 so that the screw 138 rotates. This moves the arm 136 laterally towards an alignment position relative to the die 100. When the tapper 134 is aligned with an arcuate portion of the die 100 and the gasket wrapped around the perimeter edge 104, the motor 142 stops. The table 96 moves to its elevated position in order to hold the elongate band 22 firmly in the cutter assembly 90. The knife 94 is pivoted to sever the gasket on the die 100 from the supply of the elongate band 22.

The pneumatic cylinder 132 is actuated to drive the tapper 134 strikingly against the side face of the die 100. The tapper 134 bears forcibly against the die 100 and the gasket formed thereon, and this sharp hit taps the gasket free of the die 100.

The pneumatic cylinder 132 then retracts the tapper 134. The motor 142 is reversed to move the arm 136 from its extended position to the retracted position spaced apart from the die 100.

Figure 4:
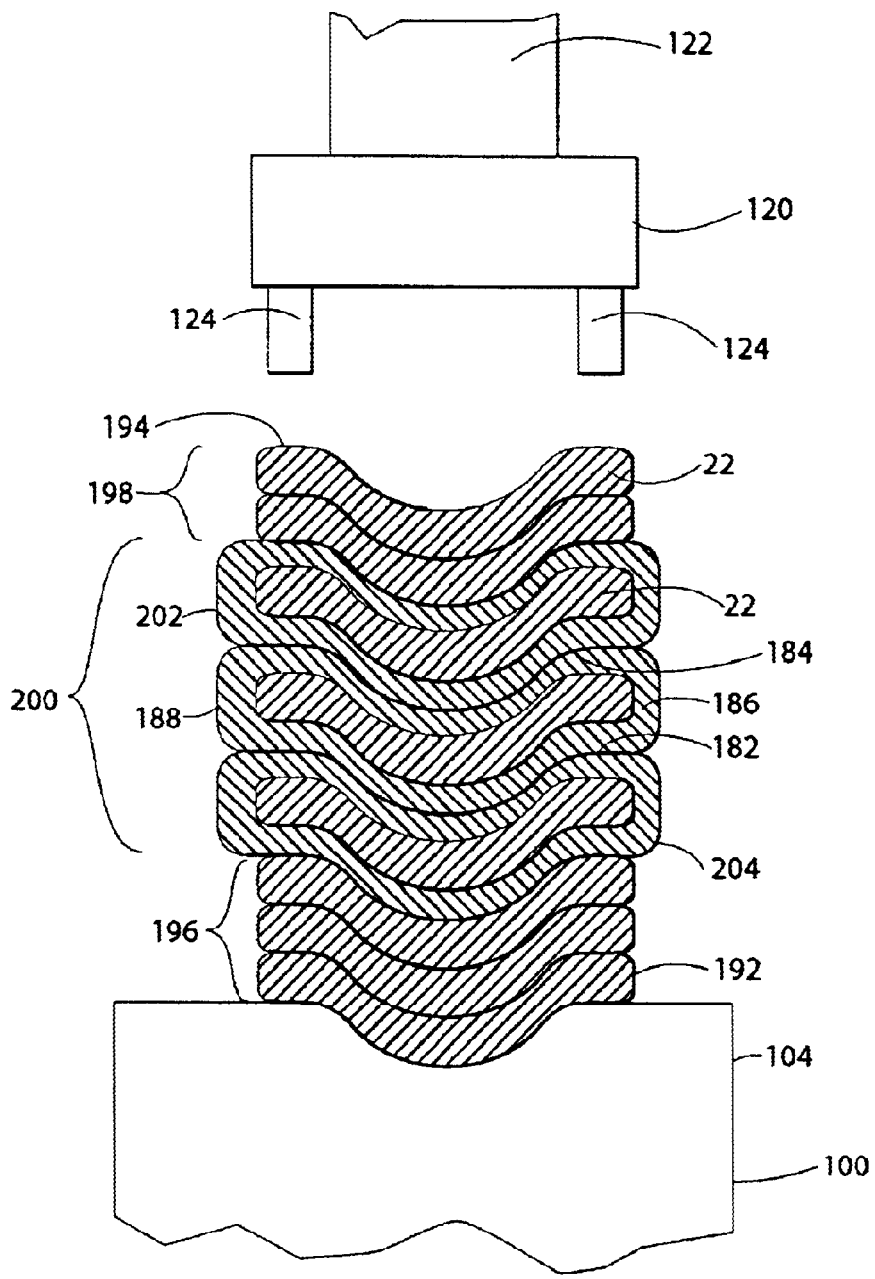
FIG. 4 is a cross-sectional view taken along line 4—4 of FIG. 1 illustrating the gasket formed on the die in the gasket forming section of the apparatus illustrated in FIG. 1.

FIG. 4 illustrates a cross-sectional view of the gasket 190 made with the apparatus 10. The gasket 190 defines an inner face 192 on the inner diameter of the gasket 190 and an outer face 194 on the outer diameter of the gasket. An inner portion 196 has a wrap and a half of the unjacketed band 22. Similarly, an outer diameter portion 198 has a wrap and a half of the unjacketed band 22. The wraps for the inner portion 196 and the wraps for the outer portion 198 are each secured by welds to hold the gasket together. An intermediate section 200 includes a plurality of turns of the jacketed elongate band 22. As the band 22 is wound around the perimeter of the die 100, the rubber sealing material in the opposing high density regions generally 122, 184 become more densely packed. The low density regions 186, 188, however, do not become more densely packed as the winding continues to form the gasket. Accordingly, the resulting gasket has opposing faces 202, 204 of a low-density sealing material which contact the faces of the flange in the connection being sealed. The low density provides a relatively low minimum seat to affect the seal. The high density sealing material 182, 184, allow the gasket to resist interbuckling. The rubber-based spiral wound gasket can subsequently be placed in a mold with an inner diameter core and an outer diameter wrap and encapsulated in a covering material, if desired. The core and the wrap are especially selected for the service tasks required these surfaces.

The present invention accordingly provides an apparatus and method for forming improved rubber-based spiral wound gaskets. The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. An apparatus for making a rubber-based spiral wound gasket, comprising:

a feeder that communicates a length of an elongate band for winding in overlapping relation to make a spiral wound gasket therefrom;

a fluid bath of a rubber-based sealing material through which at least a length of the elongate band passes to become enclosed within a jacket of sealing material;

a rotatable die defining a slot extending inwardly from a perimeter of the die and sized for receiving a distal end portion of the elongate band, for winding around the perimeter of the die a length of the elongate band including the jacketed portion thereof;

a fixing device for securing selected portions of the wound elongate band together;

a cutter for severing the elongate band, whereby the spiral wound gasket made with the length of the elongate band is separable from the apparatus; and a tapper movable from a first position in alignment with a perimeter portion of the die to a second position striking forcibly against the perimeter portion of the die to dislodge the spiral wound gasket therefrom, whereby the elongate band, being engaged to the die by the distal end portion of the elongate band being received in the slot, is wound around the perimeter of the die until a desired radially thick spiral wound gasket is formed and upon being secured together by the fixing device, the cutter operating to sever the elongate band and the tapper striking the perimeter portion of the die to dislodge the spiral wound gasket therefrom.

2. The apparatus as recited in claim 1, further comprising a pair of opposing scraping devices for selective removal of the jacket of the rubber-based sealing material from a portion of the elongate band, the scraping devices movable from a first position spaced apart from the elongate band to a second position bearing against the elongate band passing therebetween.

3. The apparatus as recited in claim 1, wherein the feeder is movable between a first position spaced-apart from the die and a second position adjacent the die for feeding the distal end portion of the elongate band into the slot.

4. The apparatus as recited in claim 1, wherein the tapper is movable between a third position spaced-apart from the die and the first position aligned with the perimeter portion of the die prior to striking the die to dislodge the spiral wound gasket.

5. The apparatus as recited in claim 1, further comprising a tracking device for measuring the radial thickness of the spiral wound gasket to determine when the desired size gasket has been wound with the elongate band.

6. The apparatus as recited in claim 5, wherein the tracking device comprises:

a roller that bears against an exterior face of the elongate band being wound on the die to form the spiral wound gasket; and a measuring device for reporting the change in position of the roller as the die winds the elongate band around the perimeter thereof.

7. The apparatus as recited in claim 1, wherein the fixing device comprises a welder having a operating tip for causing-portions of the elongate band to become secured together.

8. The apparatus as recited in claim 7, wherein the welder is an electric welder and the operating tip has an anode tip and an electrode tip for touching a selected portion of the elongate member to be secured.

9. The apparatus as recited in claim 1, wherein the fixing device is movable between a first position spaced-apart from the spiral wound gasket being wound on the die and a second position adjacent the spiral wound gasket for securing portions thereof.

10. The apparatus as recited in claim 1, wherein the elongate band is a flexible fiber web.

\* \* \* \* \*